(12) United States Patent
Ohmori (10) Patent No.: US 9,214,693 B2
(45) Date of Patent: Dec. 15, 2015

(54) SOLID OXIDE FUEL CELL (75) Inventor: Makoto Ohmori, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 929 days.

(21) Appl. No.: 13/409,392

(22) Filed: Mar. 1, 2012

(65) Prior Publication Data
US 2012/0225368 A1 Sep. 6, 2012

(30) Foreign Application Priority Data

Mar. 3, 2011 (JP) ................. 2011-045807
Dec. 6, 2011 (JP) ................. 2011-266374

(51) Int. Cl.
H01M 4/86 (2006.01)
H01M 4/90 (2006.01)
H01M 8/12 (2006.01)

(52) U.S. Cl.
CPC .......... *H01M 8/1213* (2013.01); *H01M 4/8621* (2013.01); *H01M 4/8657* (2013.01); *H01M 4/9033* (2013.01); *H01M 8/12* (2013.01); *H01M 8/126* (2013.01); *H01M 8/1253* (2013.01); *H01M 2008/1293* (2013.01); *H01M 2300/0094* (2013.01); *Y02E 60/521* (2013.01); *Y02E 60/525* (2013.01)

(58) Field of Classification Search
CPC . H01M 4/861; H01M 4/8621; H01M 4/8657; H01M 8/12; H01M 8/1213; H01M 8/1253; H01M 4/9033; H01M 8/12537; H01M 2300/0094
USPC .................. 429/482, 488, 489, 496, 529, 532
See application file for complete search history.

(56) References Cited

U.S. PATENT DOCUMENTS

| | | | | |
|---|---|---|---|---|
| 8,715,880 B2* | 5/2014 | Ohmori | | 429/482 |
| 2011/0189586 A1* | 8/2011 | Liu et al. | | 429/495 |
| 2011/0305973 A1* | 12/2011 | Kobayashi et al. | | 429/496 |
| 2012/0186976 A1* | 7/2012 | Laucournet et al. | | 204/252 |

FOREIGN PATENT DOCUMENTS

| | | |
|---|---|---|
| EP | 1 284 519 A2 | 2/2003 |
| EP | 2 061 108 A1 | 5/2009 |
| JP | 2006-286403 A | 10/2006 |
| JP | 2010-003478 A1 | 1/2010 |
| WO | WO 2011015505 A1 * | 2/2011 |

OTHER PUBLICATIONS

European Search Report, European Application No. 12157872.8, dated May 21, 2014 (5 pages).

* cited by examiner

Primary Examiner — Eugenia Wang
(74) Attorney, Agent, or Firm — Burr & Brown, PLLC (57) ABSTRACT Provided is a solid oxide fuel cell (SOFC), including: a fuel electrode for allowing a fuel gas to be reacted; an air electrode for allowing a gas containing oxygen to be reacted; an electrolyte film provided between the fuel electrode and the air electrode; and a reaction prevention film provided between the air electrode and the electrolyte film. The reaction prevention film includes two layers including one layer of a porous layer having an interface with the electrolyte film; and one layer of a dense layer having an interface with the air electrode. The dense layer has a porosity of 5% or less and the porous layer has a porosity of 5.1 to 60%. The porous layer includes closed pores each having a diameter of 0.1 to 3 μm. The porous layer includes closed pores each including a component (such as Sr) for the air electrode.

7 Claims, 6 Drawing Sheets

SOLID OXIDE FUEL CELL

BACKGROUND OF THE INVENTION

1. Field of the Invention

The present invention relates to a solid oxide fuel cell (SOFC).

2. Description of the Related Art

An SOFC includes a fuel electrode for allowing a fuel gas to be reacted, an air electrode for allowing a gas containing oxygen to be reacted, and a solid electrolyte film provided between the fuel electrode and the air electrode (see, for example, Japanese Patent Application Laid-open No. 2010-3478). When a fuel gas (e.g., hydrogen gas) and a gas containing oxygen (e.g., air) are supplied to the fuel electrode and the air electrode of the SOFC at high temperature (e.g., 500 to 1,000° C.), respectively, chemical reactions represented by the following formulae (1) and (2) occur. Through the chemical reactions, a difference in electric potential is generated between the fuel electrode and the air electrode. The difference in electric potential is originated from oxygen conductivity of a solid electrolyte.

$$(1/2)\cdot O_2 + 2e^- \rightarrow O^{2-} \text{ (at air electrode)} \quad (1)$$

$$H_2 + O^{2-} \rightarrow H_2O + 2e^- \text{ (at fuel electrode)} \quad (2)$$

In general, there may occur a phenomenon in which a reaction layer having large electric resistance is formed at the interface between the air electrode and the solid electrolyte film of the SOFC which operates at high temperature through a reaction of components for the air electrode and the solid electrolyte film. Specifically, for example, when lanthanum strontium cobalt ferrite (LSCF) is used as a material for the air electrode and yttria-stabilized zirconia (YSZ) is used as a material for the solid electrolyte film, it is known that a high-resistance layer (SrZrOx) is liable to be formed through a reaction of strontium (Sr) in LSCF and zirconium (Zr) in YSZ. Moreover, it is also known that a high-resistance layer ($La_2Zr_2O_7$) is liable to be formed through a reaction of lanthanum (La) in LSCF and zirconium (Zr) in YSZ.

Formation of the high-resistance layer may be one of the causes for increasing interfacial resistance between the air electrode and the solid electrolyte film to decrease an output of the SOFC. Therefore, it is preferred to suppress the formation of the high-resistance layer. From this point of view, in the SOFC described in the above-mentioned literature, a porous reaction prevention film including ceria (e.g., gadolinium-doped ceria (GDC)) is provided between the solid electrolyte film and the air electrode. The porosity of the reaction prevention film is set to 10 to 80%.

In addition, in the SOFC according to the above-mentioned literature, a precipitate, which is formed through precipitation of a "component for the air electrode," is entrapped (accumulated) in pores of the porous reaction prevention film. Thus, the "component for the air electrode," which moves in the reaction prevention film through diffusion, is unlikely to reach the interface between the reaction prevention film and the solid electrolyte film so that the formation of the high-resistance layer is suppressed surely, according to the above-mentioned literature.

SUMMARY OF THE INVENTION

Meanwhile, as a result of studies, it has been found that the long-term use of the SOFC according to the above-mentioned literature is liable to cause a decrease in output of the SOFC. A possible reason for this resides in that, owing to the fact that the porosity of the porous reaction prevention film is as relatively large as 10 to 80%, the "component for the air electrode" is likely to reach the interface between the reaction prevention film and the solid electrolyte film through grain boundaries in the reaction prevention film through diffusion, and thus the high-resistance layer is liable to be formed through encounter of the "component for the air electrode" and the "component for the solid electrolyte film" in the vicinity of the interface (the details are described later).

The present invention has been made to deal with the above-mentioned problem. An object of the present invention is to provide an SOFC in which a decrease in output of the SOFC due to an increase in electric resistance between an air electrode and a solid electrolyte film hardly occurs after long-term use.

An SOFC according to the present invention includes: a fuel electrode for allowing a fuel gas to be reacted; an air electrode for allowing a gas containing oxygen to be reacted; a solid electrolyte film provided between the fuel electrode and the air electrode; and a reaction prevention film provided between the air electrode and the solid electrolyte film. In this case, the reaction prevention film may include cerium. The solid electrolyte film may include zirconium. The air electrode may include a perovskite-type oxide including at least one of strontium and lanthanum.

In the SOFC according to the present invention, the reaction prevention film includes: a dense layer; and a "porous layer provided between the dense layer and the solid electrolyte film," the porous layer including closed pores each including a component for the air electrode. The dense layer, the porous layer, and the solid electrolyte film are suitably formed by simultaneous sintering.

According to the configuration described above, it has been found that a decrease in output of the SOFC due to an increase in electric resistance between the air electrode and the solid electrolyte film hardly occurs after long-term use. A possible reason for this resides in that the "component for the air electrode" (e.g., Sr) becomes unlikely to diffuse through the inner grain boundaries in the dense layer in comparison with the porous layer, thus the dense layer functions as a strong barrier layer, which makes it difficult for the "component for the air electrode" to reach the interface between the reaction prevention film and the solid electrolyte film, with the result that the high-resistance layer is unlikely to be formed in the vicinity of the interface through a reaction of the "component for the air electrode" (e.g., Sr) and the "component for the solid electrolyte film" (e.g., Zr) (the details are described later).

Another possible reason resides in that, even when part of the "components for the air electrode" passes through the dense layer to enter the porous layer through diffusion, the "component for the air electrode that has passed through the dense layer" may be entrapped (accumulated) in pores of the porous layer, thus the "component for the air electrode that has passed through the dense layer" is unlikely to reaches the interface between the reaction prevention film and the solid electrolyte film, with the result that the high-resistance layer is unlikely to be formed in the vicinity of the interface through a reaction of the "component for the air electrode that has passed through the dense layer" (e.g., Sr) and the "component for the solid electrolyte film" (e.g., Zr) (the details are described later).

In the SOFC according to the present invention, the dense layer suitably has a porosity of 5% or less and the porous layer suitably has a porosity of 5.1 to 60%. The porous layer suitably includes closed pores each having a diameter of 0.1 to 3 μm.

In addition, when the reaction prevention film includes two layers including: one layer of the porous layer having an interface with the solid electrolyte film (brought into contact with the solid electrolyte film); and one layer of the dense layer having an interface with the air electrode (brought into contact with the air electrode), the porous layer suitably has a thickness of 0.5 to 5 μm and the dense layer suitably has a thickness of 1 to 25 μm.

DETAILED DESCRIPTION OF THE INVENTION (Configuration)

Figure 1:
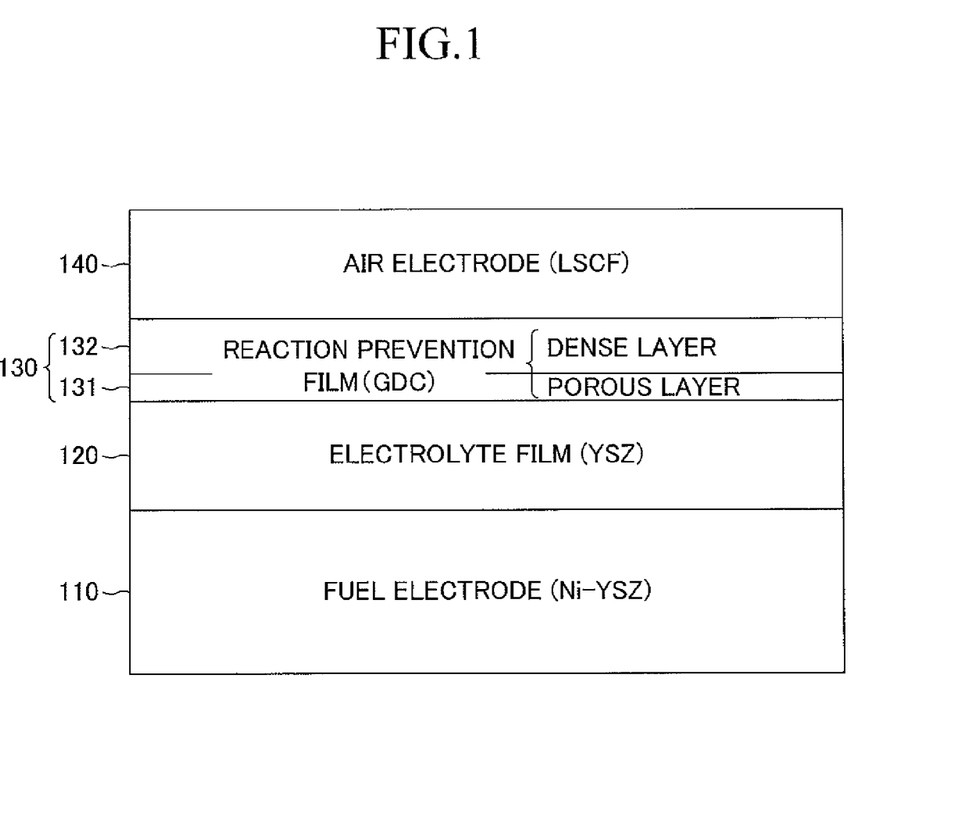
FIG. 1 is a schematic view illustrating the configuration of an SOFC according to an embodiment of the present invention.

FIG. 1 is a schematic view illustrating the configuration of an SOFC according to an embodiment of the present invention. The SOFC is a laminate including a fuel electrode 110, an electrolyte film 120 laminated on the fuel electrode 110, a reaction prevention film 130 laminated on the electrolyte film 120, and an air electrode 140 laminated on the reaction prevention film 130. As viewed from above, the cell has a square shape with a side length of 1 to 30 cm, a rectangular shape with a long side length of 5 to 30 cm and a short side length of 3 to 15 cm, or a circular shape with a diameter of 1 to 30 cm. The thickness of the cell is 0.1 to 3 mm.

The fuel electrode 110 (anode electrode) is, for example, a porous thin-plate-like sintered body including nickel oxide (NiO) and yttria-stabilized zirconia (YSZ). The fuel electrode 110 may include nickel oxide (NiO) and yttria ($Y_2O_3$). The fuel electrode 110 has a thickness of 0.1 to 3 mm. The thickness of the fuel electrode 110 is the largest among the thicknesses of components for the cell, and thus, the fuel electrode 110 functions as a support substrate for the cell. The fuel electrode 110 is subjected to a well-known reduction treatment (e.g., treatment for reducing NiO to Ni), resulting in exhibiting conductivity. The SOFC operates in a state in which the fuel electrode 110 exhibits conductivity as described above.

The fuel electrode 110 may include two layers including: a fuel-electrode active portion, which is brought into contact with the electrolyte film 120; and a fuel-electrode current-collecting portion, which corresponds to the residual portion of the fuel electrode except the fuel-electrode active portion. The fuel-electrode active portion may include nickel oxide (NiO) and yttria-stabilized zirconia (YSZ). Alternatively, the fuel-electrode active portion may include nickel oxide (NiO) and gadolinium-doped ceria (GDC). The fuel-electrode current-collecting portion may include nickel oxide (NiO) and yttria-stabilized zirconia (YSZ), for example. Alternatively, the fuel-electrode current-collecting portion may include nickel oxide (NiO) and yttria ($Y_2O_3$).

As described above, the fuel-electrode current-collecting portion includes a substance having electron conductivity. The fuel-electrode active portion includes a substance having electron conductivity and a substance having oxygen ion conductivity. The "volume ratio of the substance having oxygen ion conductivity relative to the total volume except the pores" in the fuel-electrode active portion is larger than the "volume ratio of the substance having oxygen ion conductivity relative to the total volume except the pores" in the fuel-electrode current-collecting portion.

The electrolyte film 120 is a dense thin-plate-like sintered body including a zirconium-containing material, e.g., YSZ. The electrolyte film 120 has a thickness of 3 to 30 μm.

The reaction prevention film 130 is a thin-plate-like sintered body including ceria. Specific examples of the ceria include gadolinium-doped ceria (GDC) and samarium-doped ceria (SDC). The reaction prevention film 130 is interposed between the electrolyte film 120 and the air electrode 140 in order to suppress a phenomenon that a high-resistance layer is formed between the electrolyte film 120 and the air electrode 140 through a reaction of zirconium (Zr) in the electrolyte film 120 and strontium (Sr) in the air electrode 140 during cell production or during SOFC operation.

In the example illustrated in FIG. 1, the reaction prevention film 130 includes two layers including one layer of a porous layer 131 having an interface with the electrolyte film 120 (brought into contact with the electrolyte film 120) and one layer of a dense layer 132 having an interface with the air electrode 140 (brought into contact with the air electrode 140). The porous layer 131 has a thickness of 0.5 to 5 μm and the dense layer 132 has a thickness of 1 to 25 μm. In other words, it can be said that "in the reaction prevention film 130 (film located between the electrolyte film 120 and the air electrode 140), pores are distributed only in a region within a range of 0.5 to 5 μm from the interface with the electrolyte film 120." The thickness of the reaction prevention film 130 (total thickness of the porous layer 131 and the dense layer 132) is 3 to 30 μm. The detail configuration of the reaction prevention film 130 and actions and effects of the configuration are described in detail later.

The air electrode 140 (cathode electrode) is, for example, a porous thin-plate-like sintered body including a perovskite-type oxide. As the perovskite-type oxide, there may be adopted lanthanum strontium cobalt ferrite LSCF ((La, Sr)(Co, Fe)$O_3$), lanthanum strontium ferrite (LSF=(La, Sr)FeO$_3$), lanthanum nickel ferrite (LNF=La(Ni, Fe)$O_3$), lanthanum strontium cobaltite (LSC=(La, Sr)CoO$_3$), or the like. The air electrode 140 has a thickness of 10 to 100 μm.

The outline of the configuration of the SOFC illustrated in FIG. 1 is as described above. A plurality of SOFCs may be electrically connected in series via current-collecting members (interconnectors) and utilized. This allows a large output to be provided. As an exemplary embodiment in which a plurality of SOFCs are electrically connected in series, there may be adopted a mode in which a plurality of "power-generating portions as laminates of a fuel electrode, an electrolyte film, and an air electrode" are laminated in a lamination direction (so-called "vertical stripe type"), or a mode in which the power-generating portions are disposed at different portions on the surface of a plate-like support, respectively (so-called "horizontal stripe (segmented-in-series) type").

(Manufacturing Method)

Then, an exemplary manufacturing method for the SOFC illustrated in FIG. 1 is described. Hereinafter, the term "green body" means a state before sintering. First, a green body of the fuel electrode 110 was formed as described below. Namely, an NiO powder and a YSZ powder were mixed with each other. Then, polyvinyl alcohol (PVA) was added as a binder to the mixture to produce a slurry. The slurry was dried and granulated with a spray dryer to obtain a powder for the fuel electrode. The powder was molded by press molding with a mold to form a green body of the fuel electrode 110.

Then, a green body of the electrolyte film 120 was laminated and formed on the upper surface of the green body of the fuel electrode 110 as described below. Namely, water and a binder were added to a YSZ powder, and the mixture is blended in a ball mill for 24 hours to produce a slurry. The slurry is coated and dried on the upper surface of the green body of the fuel electrode 110 to form a green body (film) of the electrolyte film 120. It should be noted that, in the formation of the green body of the electrolyte film 120 on the upper surface of the green body of the fuel electrode 110, a tape lamination method, a printing method, and the like may be employed.

Then, a green body of the reaction prevention film 130 was formed on the upper surface of the green body of the electrolyte film 120 as described below. Namely, water and a binder were added to a GDC powder, and the mixture was blended in a ball mill for 24 hours to produce a slurry. The slurry was coated and dried on the upper surface of the green body of the electrolyte film 120 to form a green body (film) of the reaction prevention film 130. It should be noted that, in the formation of the green body of the reaction prevention film 130 on the upper surface of the green body of the electrolyte film 120, a tape lamination method, a printing method, and the like may be employed.

In the example illustrated in FIG. 1, the reaction prevention film 130 includes two layers including the porous layer 131 and the dense layer 132. In this case, a green body (film) for the porous layer 131 may be formed on the upper surface of the green body of the electrolyte film 120 and then a green body (film) for the dense layer 132 may be formed on the upper surface of the green body of the porous film 131 (hereinafter, referred to as "separate formation"), or one green body (film) for two layers including the porous layer 131 and the dense layer 132 may be formed on the upper surface of the green body of the electrolyte film 120 (hereinafter, referred to as "simultaneous formation").

When the "separate formation" is adopted, as described later, the adjustment of the porosities of the porous layer 131 and the dense layer 132 can be achieved by adjusting the powder characteristics (particle diameter and specific surface area) of a GDC powder, the slurry characteristics (solid-liquid ratio and composition of organic materials such as a binder), and the like. Specifically, as the GDC powder to be used for the porous layer 131, it is preferred to use a powdery material having an average particle diameter of 0.6 to 2.0 µm and a specific surface area of 1 to 10 $m^2/g$. Moreover, a pore-forming material may be added. As the pore-forming material, there may be used a polymethyl methacrylate resin (PMMA) having an average particle diameter of 0.1 to 1 µm. The addition amount of the pore-forming material is preferably 0.1 to 10 wt % (outer percentage). On the other hand, as the GDC powder to be used for the dense layer 132, it is preferred to use a powdery material having an average particle diameter of 0.1 to 1.0 µm and a specific surface area of 5 to 30 $m^2/g$.

When the "simultaneous formation" is adopted, as described later, the adjustment of the porosity of the porous layer 131 can be achieved by utilizing a difference in diffusion velocity among elements in the co-sintering of the green body of the electrolyte film 120 and the green body of the reaction prevention film 130. Specifically, as the GDC powder, it is preferred to use a powdery material having an average particle diameter of 0.3 to 1.5 µm and a specific surface area of 3 to 20 $m^2/g$.

As described above, a laminate (before sintering) of the green body of the fuel electrode 110, the green body of the electrolyte film 120, and the green body of the reaction prevention film 130 was formed. The laminate (before sintering) was co-sintered at 1,300 to 1,600° C. for 1 to 20 hours to obtain a laminate (after sintering) of the porous fuel electrode 110, the dense electrolyte film 120, and the "reaction prevention film 130 including two layers including the porous layer 131 and the dense layer 132." As described above, the reaction prevention film 130 (after sintering) is formed by the co-sintering with the electrolyte film 120.

Then, an air electrode 140 was formed on the upper surface of the reaction prevention film 130 of the laminate (after sintering) as described below. Namely, water and a binder were added to an LSCF powder, and the mixture was blended in a ball mill for 24 hours to produce a slurry. The slurry was coated and dried on the upper surface of the reaction prevention film 130, and sintered at 1,000° C. for 1 hour in air in an electric furnace (in an oxygen-containing atmosphere) to form a porous air electrode 140 on the upper surface of the reaction prevention film 130. So far, the exemplary manufacturing method for the SOFC illustrated in FIG. 1 has been described.

(Details of Reaction Prevention Film)

Figure 2:
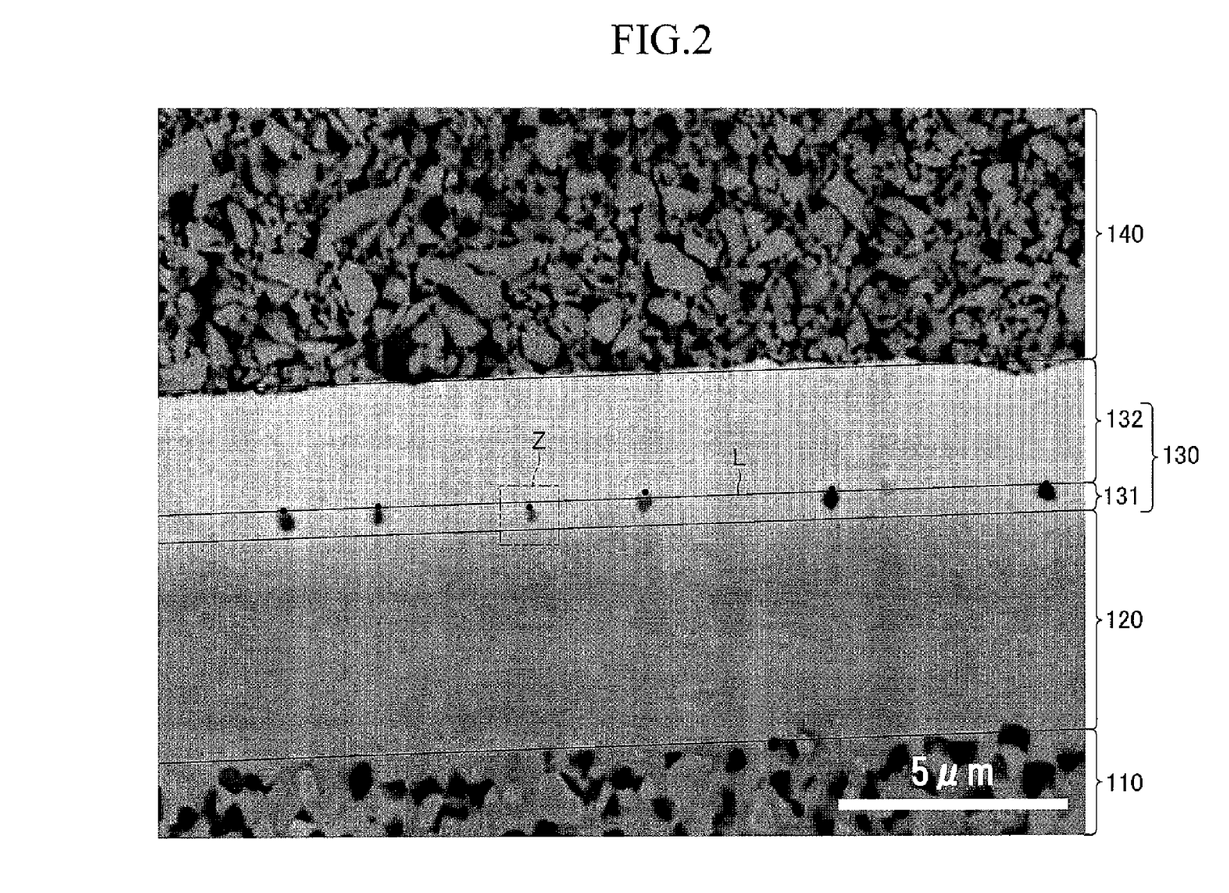
FIG. 2 is an SEM image showing an example of a cross-section of the SOFC according to the embodiment of the present invention.

Then, the reaction prevention film 130 of the SOFC illustrated in FIG. 1 is described in detail. FIG. 2 is a scanning electron microscope (SEM) image showing an example of a cross-section of a sample of the SOFC illustrated in FIG. 1 obtained when the sample is cut in a thickness direction (lamination direction). As shown in FIG. 2, the reaction prevention film 130 includes two layers including one layer of the porous layer 131 and one layer of the dense layer 132. The porous layer 131 is brought into contact with the electrolyte film 120 (has an interface with the electrolyte film 120). The dense layer 132 is brought into contact with the air electrode 140 (has an interface with the air electrode 140).

For example, the boundary (interface) between the porous layer 131 and the dense layer 132 is defined as described below. First, an SEM image of the cross-section of the reaction prevention film 130 in a thickness direction is obtained. In the SEM image (visual field), a plurality of pores distributed only in the "region near the interface with the electrolyte film 120" in the reaction prevention film 130 (i.e., film located between the electrolyte film 120 and the air electrode 140) are specified. Among the plurality of pores specified as described above, a plurality of pores located facing the air electrode 140 are extracted. In the example shown in FIG. 2, all of the plurality of pores specified are extracted as "pores located facing the air electrode 140." For each of the plurality of pores extracted, the pores nearest the air electrode 140 (on the upper side in FIG. 2) in the corresponding regions in the pores are specified (see the black dots on the upper parts of the pores in FIG. 2). Through application of one of the well-known statistical techniques (e.g., least squares method) to the plurality of pores specified, a line passing through the regions near the plurality pores specified is defined. The line (line segment L in the example shown in FIG. 2) is the boundary (interface) between the porous layer 131 and the dense layer 132.

For example, the boundary (interface) between the porous layer 131 and the electrolyte film 120 can be defined as described below. First, line analysis in a thickness direction is conducted with EPMA for the cross-section in the thickness direction of a laminated portion including the reaction prevention film 130 and the electrolyte film 120. According to the line analysis, the concentration distribution data of each element is obtained. Based on the concentration distribution data, the position of the line at which the concentration of cerium is consistent with the concentration of zirconium is the boundary (interface) between the porous layer 131 and the electrolyte film 120.

The porous layer 131 has a porosity of 5.1 to 60% and the dense layer 132 has a porosity of 5% or less. Herein, the porosity of the porous layer 131 refers to a "ratio of the volume of pores (voids) relative to the total volume of the porous layer 131" and the porosity of the dense layer 132 refers to a "ratio of the volume of pores (voids) relative to the total volume of the dense layer 132."

For example, the porosity of the porous layer 131 can be calculated by obtaining an SEM image of the cross-section in a thickness direction of the reaction prevention film 130. Namely, first, the boundary (interface) between the porous layer 131 and the dense layer 132 is obtained by the method as described above in the SEM image (visual field). Then, a plurality of pores (closed pores) located in the region corresponding to the porous layer 131 in the SEM image are specified. Then, the total area of the region corresponding to the porous layer 131 in the SEM image is obtained. Then, the sum of areas of the plurality of specified pores in the SEM image is obtained. The porosity of the porous layer 131 is calculated by dividing the "sum of areas of the plurality of pores" by the total area of the region corresponding to the porous layer 131." A technique for estimating a three-dimensional structure from a two-dimensional structure as described above is described in detail in "Tadayasu Mizutani, Yoshiharu Ozaki, Toshio Kimura, Takashi Yamaguchi, "Ceramic Processing," GIHODO SHUPPAN Co., Ltd., published on Mar. 25, 1985, pp. 190-201."

One porosity calculated based on one image (visual field) obtained from one cross-section may be regarded as the porosity of the entire porous layer, or an average value of a plurality of porosities respectively calculated based on a plurality of images (visual fields) respectively obtained from a plurality of cross-sections may be regarded as the porosity of the entire porous layer. The porosity of the dense layer 132 can be calculated in the same manner as the porosity of the porous layer 131.

Moreover, the diameter of each of numerous pores (closed pores) in the porous layer 131 is 0.1 to 3 μm. Herein, the diameter of a pore (closed pore) is, for example, a diameter of a circle having an area equal to that of the region corresponding to the pore in the SEM image, for example.

When the reaction prevention film 130 (two layers) is formed by the "separate formation" as described above, the adjustment of the porosities of the porous layer 131 and the dense layer 132 can be achieved by adjusting the powdery characteristics (particle diameter and specific surface area) of a powder as a raw material (e.g., GDC) for the reaction prevention film, the slurry characteristics (solid-liquid ratio and composition of organic materials such as a binder), and the like.

Specifically, for example, the solid-liquid ratio of the slurry for the dense layer 132 (ratio of a solid, that is, a raw material for the reaction prevention film in the whole slurry) is set higher than the solid-liquid ratio of the slurry for the porous layer 131. This is based on the fact that, as the solid-liquid ratio of the slurry becomes larger, the density of a green body becomes higher and thus the porosity of the green body after sintering becomes smaller.

Alternatively, the specific surface area of a material (e.g., GDC) for the dense layer 132 is set higher than the specific surface area of a material (e.g., GDC) for the porous layer 131. This is based on the fact that, as the specific surface area of a powder becomes larger, the porosity becomes smaller owing to an increase in sintering performance.

Further, when the reaction prevention film 130 (two layers) is formed by "simultaneous formation" as described above, only the slurry for the dense layer 132 is used as the slurry for the entire reaction prevention film 130 (two layers). On the other hand, the pores of the porous layer 131 are positively formed by utilizing differences in diffusion velocity among elements in the co-sintering of the green body of the electrolyte film 120 and the green body of the reaction prevention film 130. In other words, the pores of the porous layer 131 are formed as the so-called "Kirkendall pores."

Figure 3:
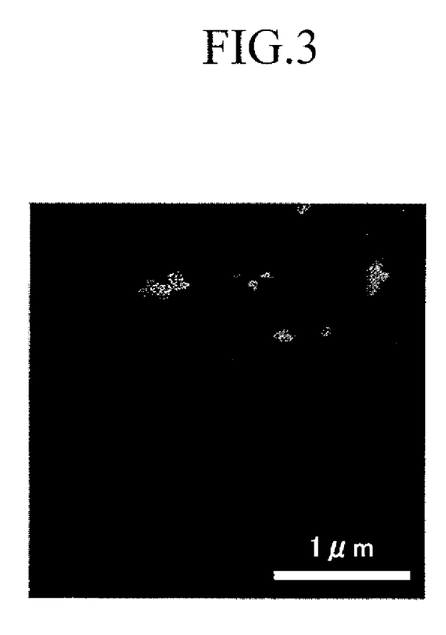
FIG. 3 is an image showing an example of the results of Sr mapping conducted for the corresponding site in the image shown in FIG. 2.

In addition, the component for the air electrode 140 (LSCF) may be contained in the pores (closed pores) of the porous layer 131. FIG. 3 shows an example of the results of Sr mapping conducted for the "Z" portion shown in FIG. 2. In FIG. 3, image brightness indicates an element concentration, and higher brightness (almost white) indicates a higher element concentration and lower brightness (almost black) indicates a lower element concentration. It should be noted that, the images and analysis results were obtained by using a field-emission analytical electron microscope (JXA-8500F) manufactured by JEOL Ltd.

As can be understood from FIG. 3, Sr (one of the components for the air electrode 140 (LSCF)) may be contained in the pores (closed pores) of the porous layer 131. It should be noted that, it is confirmed that La, Co, and Fe (additional components for the air electrode 140 (LSCF)) may be contained as additional components in the pores (closed pores) of the porous layer 131.

The components present in the pores (closed pores) of the porous layer 131 as described above are not present in the slurry for the porous layer 131. Namely, it is considered that those components are components (precipitates) that have moved into the pores (closed pores) of the porous layer 131 from the air electrode 140 through the dense layer 132 by the "diffusion through grain boundaries in the reaction prevention film 130" during SOFC production or during SOFC operation.

(Actions and Effects)

Figure 4:
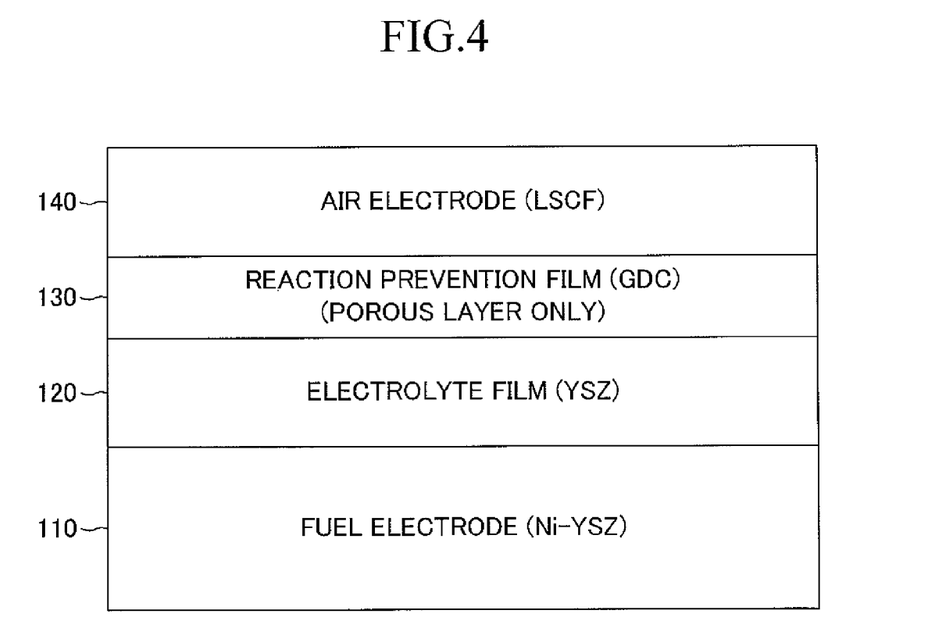
FIG. 4 is a schematic view illustrating the configuration of an SOFC according to a comparative embodiment.
Figure 5:
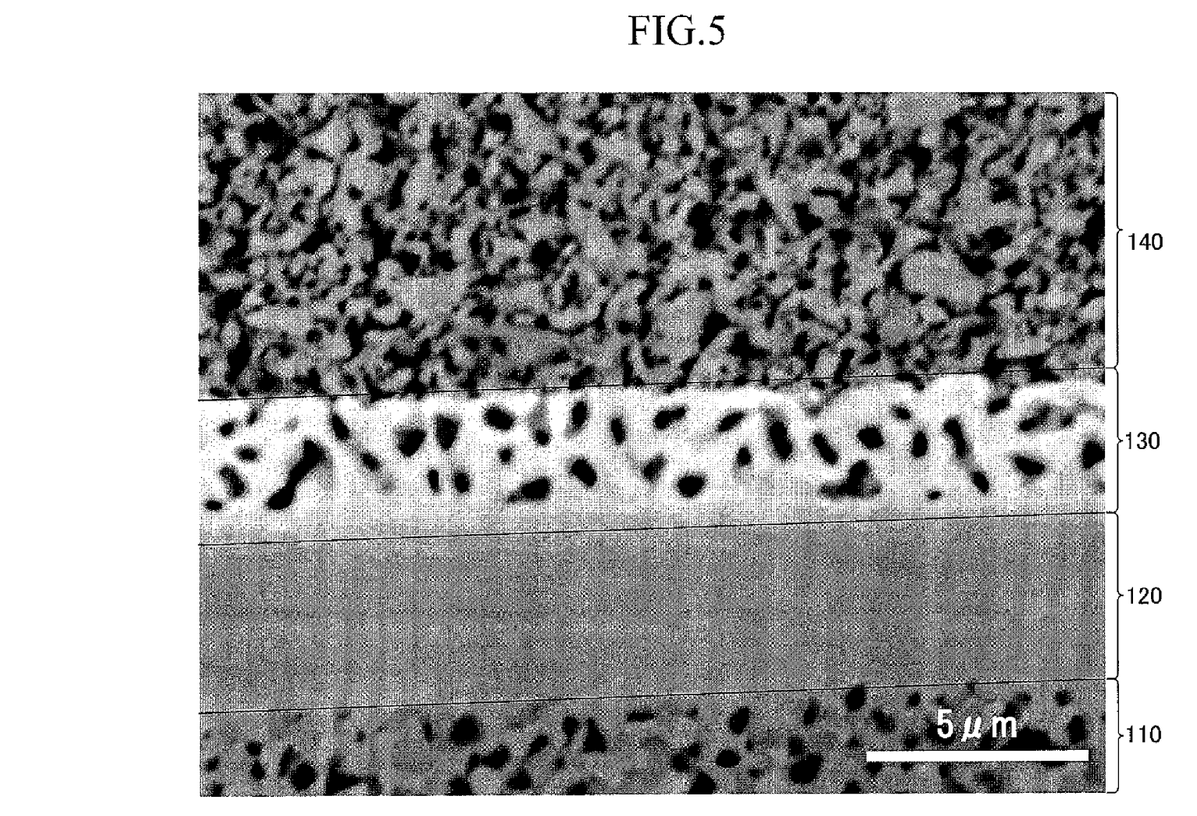
FIG. 5 is an SEM image showing an example of a cross-section of the SOFC according to the comparative embodiment shown in FIG. 4.

Then, actions and effects of the reaction prevention film 130 of the SOFC according to the embodiment are described. In order to describe the actions and effects of the reaction prevention film 130 according to the embodiment, an SOFC described in Japanese Patent Application Laid-open No. 2010-3478 described above is introduced as a comparative embodiment. FIGS. 4 and 5 are views corresponding to FIGS. 1 and 2 described above according to the comparative embodiment. In FIG. 4, the same symbols as those illustrated in FIG. 1 are given to the same configuration as that illustrated in FIG. 1.

The configuration of the SOFC according to the comparative embodiment is different only in the reaction prevention film 130 from that of the SOFC according to the embodiment. Namely, in the SOFC according to the embodiment, the reaction prevention film 130 includes two layers including the porous layer 131 and the dense layer 132, while in the SOFC according to the comparative embodiment, the reaction prevention film 130 includes only a porous layer (one layer). The reaction prevention film 130 (one layer of the porous layer) of the SOFC according to the comparative embodiment has a porosity of 10 to 80%.

It was confirmed that the components (precipitates) for the air electrode 140 (LSCF) such as Sr and La were contained in the pores (closed pores) of the reaction prevention film 130

(one layer of the porous layer) of the SOFC according to the comparative embodiment in the same manner as the porous layer 131 of the SOFC according to the embodiment.

Further, as described above, in the SOFC according to the embodiment, the reaction prevention film 130 (after sintering) is formed by the co-sintering (1,300 to 1,600° C.) with the electrolyte film 120, while in the SOFC according to the comparative embodiment, the reaction prevention film 130 (after sintering) is formed by the co-sintering (1,000° C.) with the air electrode 140. Namely, in the SOFC according to the embodiment, the sintering temperature of the electrolyte film 120 is equal to the sintering temperature of the reaction prevention film 130, while in the SOFC according to the comparative embodiment, the sintering temperature of the reaction prevention film 130 is lower than the sintering temperature of the electrolyte film 120.

(Evaluation of Decrease in Output of SOFC)

The inventor has found that, in the SOFC according to the embodiment, a decrease in output of the SOFC hardly occurs after the long-term use in comparison with the SOFC according to the comparative embodiment. Hereinafter, an examination for verification of the fact is described.

In this examination, a plurality of samples having different combinations of porosities and thicknesses of reaction prevention films (GDC) were prepared for each of the SOFC according to the embodiment and the SOFC according to the comparative embodiment. Specifically, 18 kinds of standards (combinations) were prepared as shown in Table 1. In Table 1, cases where the reaction prevention film includes one layer of the porous layer (standards 1 to 6) each correspond to the comparative embodiment and cases where the reaction prevention film includes two layers including one layer of the porous layer and one layer of the dense layer (standards 7 to 18) each correspond to the embodiment.

to 18 in Table 1, the diameter (minimum value to maximum value) of each of the closed pores in the porous layer 131 was 0.1 to 3 μm.

The temperature of each sample was increased to 800° C. while nitrogen gas was supplied to the fuel electrode 110 side and air was supplied to the air electrode 140 side. Then, when the temperature reached 800° C., a reduction treatment was conducted for 3 hours while hydrogen gas was supplied to the fuel electrode 110. After the reduction treatment, an endurance test was conducted. In the endurance test, a change rate in voltage of the SOFC was evaluated under a constant current condition at a constant current density of 0.3 A/cm$^2$. Herein, the change rate (%) in voltage per 1,000 hours is defined as a "cell voltage decay rate." It is considered that a small "cell voltage decay rate" means a small change rate in resistance of the entire SOFC, that is, a small increase in electric resistance of the reaction prevention film.

As can be understood from Table 1, the cell voltage decay rate of the SOFC according to the embodiment is extremely smaller than the cell voltage decay rate of the SOFC according to the comparative embodiment. Namely, it can be said that an increase in electric voltage of the reaction prevention film 130 after the endurance test of the SOFC according to the embodiment is smaller than that of the SOFC according to the comparative embodiment.

Such results were obtained possibly because of the following reason. Namely, in the comparative embodiment, owing to the fact that the porosity of the reaction prevention film 130 including one layer of the porous layer is as relatively large as 10 to 80%, the "component for the air electrode 140" (e.g., Sr) is likely to diffuse in the reaction prevention film 130. Therefore, the "component for the air electrode 140" is likely to pass through the reaction prevention film 130 to reach the interface between the reaction prevention film 130 and the electrolyte film 120 through diffusion. Thus, after the long-

TABLE 1

| | Configuration | | | | Evaluation results | |
|---|---|---|---|---|---|---|
| | Thickness of reaction prevention film (μm) | | Porosity of reaction prevention film (%) | | Cell voltage decay rate (%) | |
| Standard | Porous layer | Dense layer | Porous layer | Dense layer | | Judgement |
| 1 | 5 | — | 10 | — | 7.2 | X |
| 2 | 15 | — | 25 | — | 7.3 | X |
| 3 | 30 | — | 40 | — | 8.5 | X |
| 4 | 5 | — | 55 | — | 6.9 | X |
| 5 | 15 | — | 70 | — | 6.6 | X |
| 6 | 30 | — | 80 | — | 6.5 | X |
| 7 | 0.5 | 1 | 5.1 | 1.0 | 0.18 | ◉ |
| 8 | 1.2 | 5 | 10 | 1.8 | 0.22 | ◉ |
| 9 | 2.5 | 10 | 25 | 3.3 | 0.45 | ◉ |
| 10 | 4 | 20 | 45 | 4.5 | 0.26 | ◉ |
| 11 | 5 | 25 | 60 | 5.0 | 0.35 | ◉ |
| 12 | 0.3 | 5 | 15 | 1.5 | 1.8 | ○ |
| 13 | 6 | 5 | 15 | 1.5 | 2.5 | ○ |
| 14 | 3 | 0.5 | 15 | 1.5 | 1.5 | ○ |
| 15 | 3 | 30 | 15 | 1.5 | 2.2 | ○ |
| 16 | 3 | 5 | 4 | 1.5 | 1.6 | ○ |
| 17 | 3 | 5 | 65 | 1.5 | 2.1 | ○ |
| 18 | 3 | 5 | 15 | 8 | 2.8 | ○ |

In these samples, the thicknesses of the fuel electrode 110 (Ni—YSZ), the electrolyte film 120 (YSZ), and the air electrode 140 (LSCF) were kept constant at 500 μm, 5 μm, and 50 μm, respectively. Each sample had a circular shape with a diameter of 30 mm as viewed from above. In the standards 10 term use (after the endurance test), a high-resistance layer (e.g., SrZrOx) is liable to be formed through encounter of the "component for the air electrode 140" (e.g., Sr) and the "component for the electrolyte film 120" (e.g., Zr) in the vicinity of the interface. As a result, it is considered that after the long-term use (after the endurance test), the electric resistance of the reaction prevention film 130 is liable to increase.

In the SOFC according to the embodiment, in contrast, the reaction prevention film 130 includes the dense layer 132. The "component for the air electrode 140" (e.g., Sr) becomes less likely to diffuse through the grain boundaries in the dense layer 132 than in the porous layer 131. Therefore, the "component for the air electrode 140" becomes unlikely to reach the interface between the reaction prevention film 130 and the electrolyte film 120 because the dense layer 132 functions as a strong barrier layer. Thus, even after the long-term use (after the endurance test), a high-resistance layer (e.g., SrZrOx) is unlikely to be formed through a reaction of the "component for the air electrode 140" (e.g., Sr) and the "component for the electrolyte film 120" (e.g., Zr) in the vicinity of the interface. As a result, it is considered that even after the long-term use (after the endurance test), the electric resistance of the reaction prevention film 130 is unlikely to increase.

Moreover, it is considered that the "component for the air electrode 140" (e.g., Sr) may pass through the dense layer 132 to enter the porous layer 131 through diffusion. Also in this case, the "component for the air electrode 140 that has passed through the dense layer 132" may be entrapped (accumulated) in the closed pores of the porous layer 131. Therefore, the "component for the air electrode 140 that has passed through the dense layer 132" becomes unlikely to reach the interface between the reaction prevention film 130 and the electrolyte film 120.

In the comparative embodiment, moreover, as the pores in the reaction prevention film 130 are considered to be open pores, so-called "vapor-phase diffusion" may easily occur in the reaction prevention film 130 through the open pores (i.e., vapor phase). In the comparative embodiment, therefore, the "component for the air electrode 140" (e.g., Sr) easily diffuses in the reaction prevention film 130. In the embodiment, in contrast, as the pores in the porous layer 131 are closed pores, the so-called "solid-phase diffusion" may occur through the grain boundaries (i.e., solid phase) in the porous layer 131, while the "vapor-phase diffusion" is unlikely to occur. The diffusion velocity of the solid-phase diffusion is remarkably smaller than the diffusion velocity of the vapor-phase diffusion. Therefore, the "component for the air electrode 140" (e.g., Sr) is unlikely to diffuse in the porous layer 131. For this reason as well, it can be said that, in the embodiment, the "component for the air electrode 140 that has passed through the dense layer 132" becomes unlikely to reach the interface between the reaction prevention film 130 and the electrolyte film 120.

Even after the long-term use (after the endurance test), therefore, the high-resistance layer (e.g., SrZrOx) is unlikely to be formed through a reaction of the "component for the air electrode 140 that has passed through the dense layer 132" (e.g., Sr) and the "component for the electrolyte film 120" (e.g., Zr) in the vicinity of the interface. As a result, it is considered that after the long-term use (after the endurance test), the electric resistance of the reaction prevention film 130 is unlikely to increase.

It should be noted that, although the GDC was employed as the material for the reaction prevention film 130 (the porous layer 131 and the dense layer 132) in the foregoing test, it was confirmed that, even when SDC was employed as the material, results similar to the ones as described above were exhibited. Further, the material for the porous layer 131 may be different from the material for the dense layer 132.

Figure 6:
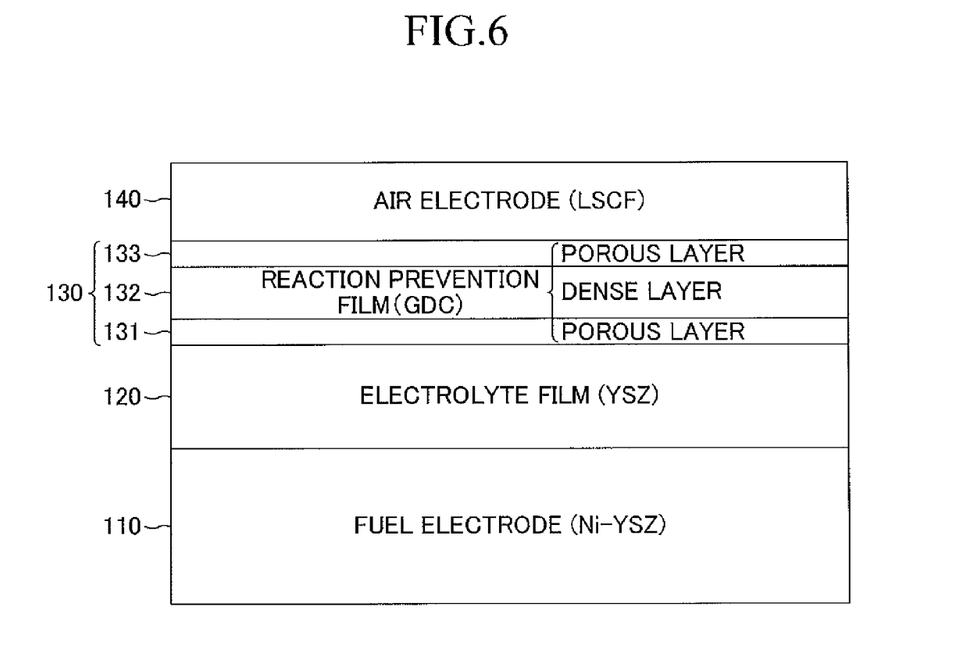
FIG. 6 is a schematic view illustrating the configuration of an SOFC according to a modified embodiment of the present invention.

The present invention is not limited to the embodiment and every kind of variation and modification may be made without departing from the scope of the present invention. For example, in the embodiment, the reaction prevention film 130 includes two layers of the one porous layer 131 having the interface with the electrolyte film 120 and the one dense layer 132 having the interface with the air electrode 140. As illustrated in FIG. 6, however, the reaction prevention film 130 may include three layers of the one porous layer 131 having the interface with the electrolyte film 120, the one porous layer 133 having the interface with the air electrode 140, and the dense layer 132 between the porous layers 131, 133. Namely, the reaction prevention film may include any number of layers as long as the reaction prevention film (the film containing ceria and located between the electrolyte film and air electrode) includes the dense layer at a portion thereof along the thickness direction thereof and the porous layer provided between the dense layer and the electrolyte film.

What is claimed is:

1. A solid oxide fuel cell, comprising:
a fuel electrode for allowing a fuel gas to be reacted;
an air electrode for allowing a gas containing oxygen to be reacted;
a solid electrolyte film provided between the fuel electrode and the air electrode; and
a reaction prevention film provided between the air electrode and the solid electrolyte film,
wherein the reaction prevention film comprises:
a dense layer; and
a porous layer provided between the dense layer and the solid electrolyte film,
the porous layer comprising closed pores each containing a component for the air electrode; and
wherein the porous layer has an interface with the solid electrolyte film, the dense layer has an interface with the air electrode, the porous layer has a thickness of 0.5 to 5 µm, and the dense layer has a thickness of 1 to 25 µm.

2. The solid oxide fuel cell according to claim 1, wherein the dense layer has a porosity of 5% or less and the porous layer has a porosity of 5.1 to 60%.

3. The solid oxide fuel cell according to claim 1, wherein the closed pores each have a diameter of 0.1 to 3 µm.

4. The solid oxide fuel cell according to claim 1, wherein the dense layer, the porous layer, and the solid electrolyte film are formed by simultaneous sintering.

5. The solid oxide fuel cell according to claim 1, wherein the reaction prevention film comprises cerium.

6. The solid oxide fuel cell according to claim 1, wherein the solid electrolyte film comprises zirconium.

7. The solid oxide fuel cell according to claim 1, wherein the air electrode comprises a perovskite oxide containing at least one of strontium and lanthanum.

* * * * *